(12) United States Patent
Ott

(10) Patent No.: US 11,084,344 B2
(45) Date of Patent: Aug. 10, 2021

(54) HITCHIN LASER GUIDE

(71) Applicant: Charles Lawrence Ott, Germantown, TN (US)

(72) Inventor: Charles Lawrence Ott, Germantown, TN (US)

(*) Notice: Subject to any disclaimer, the term of this patent is extended or adjusted under 35 U.S.C. 154(b) by 39 days.

(21) Appl. No.: 16/208,684

(22) Filed: Dec. 4, 2018

(65) Prior Publication Data
US 2020/0171896 A1  Jun. 4, 2020

(51) Int. Cl.
*B60D 1/36* (2006.01)
*B60D 1/62* (2006.01)

(52) U.S. Cl.
CPC ............ *B60D 1/36* (2013.01); *B60D 1/62* (2013.01)

(58) Field of Classification Search
CPC .......... G03B 17/265; B60D 1/36; B60D 1/62
USPC .......................................................... 33/264
See application file for complete search history.

(56) References Cited

U.S. PATENT DOCUMENTS

| 4,351,113 A | 9/1982 | Eggertsen et al. | |
| 4,687,220 A * | 8/1987 | Danielson | B60D 1/36 116/28 R |
| 5,425,181 A | 6/1995 | Calvert | |
| 6,178,650 B1 * | 1/2001 | Thibodeaux | B60D 1/36 280/477 |
| 6,827,363 B1 * | 12/2004 | Amerson | B60D 1/36 280/477 |
| 6,851,697 B2 * | 2/2005 | Kinnard | B60D 1/36 280/477 |
| 7,243,431 B2 * | 7/2007 | Godwin | B60D 1/36 280/477 |
| 8,365,422 B1 * | 2/2013 | Ott | B60D 1/62 33/264 |
| 10,252,588 B2 * | 4/2019 | Scott | B60D 1/075 |
| 2005/0128059 A1 * | 6/2005 | Vause | B60D 1/36 340/431 |
| 2006/0108771 A1 * | 5/2006 | Elkins | B60D 1/36 280/477 |
| 2006/0244578 A1 * | 11/2006 | Martin | B60D 1/36 340/431 |
| 2006/0267745 A1 * | 11/2006 | Larson | B60D 1/36 340/431 |
| 2018/0134314 A1 | 5/2018 | Lavoie et al. | |
| 2020/0171896 A1 * | 6/2020 | Ott | B60D 1/36 |

* cited by examiner

Primary Examiner — Yaritza Guadalupe-McCall

(57) ABSTRACT

An operator, using the Laser Guide operating procedure, can accurately position the Guide vehicles to the hitch point of a vehicle, trailer or 5th wheel. The operator may choose to use the dual lasers (prior art), the Guide and lasers, or only the Guide. The Guide mechanism consists of a retractable tape to connect the vehicles, a dual light signaling device, a rolling stop switch, and a backup camera display or a panel. A one time initial setup with vehicles hitched, requires several minutes. The hitching procedure is user friendly. The accuracy of the Guide can be demonstrated by a working model.

3 Claims, 5 Drawing Sheets

Figure 4:
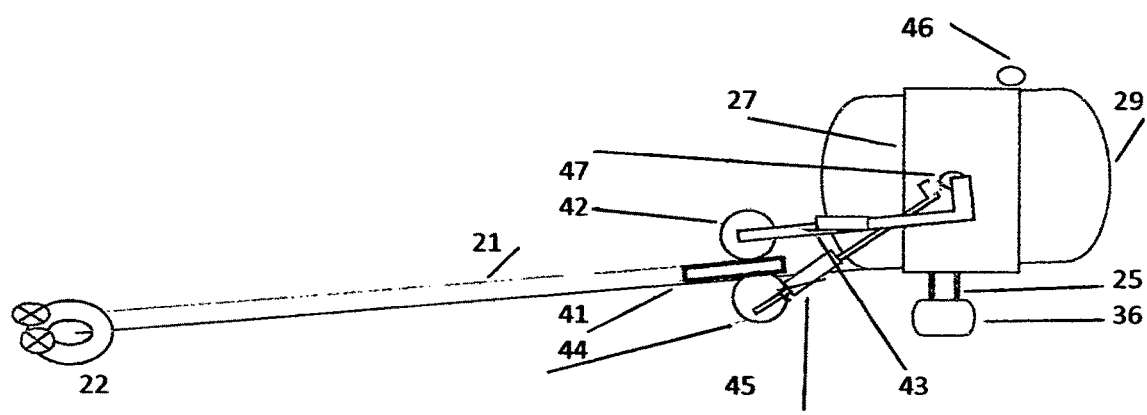

Fig. 6    [[ Fig. 1 ]]    prior art
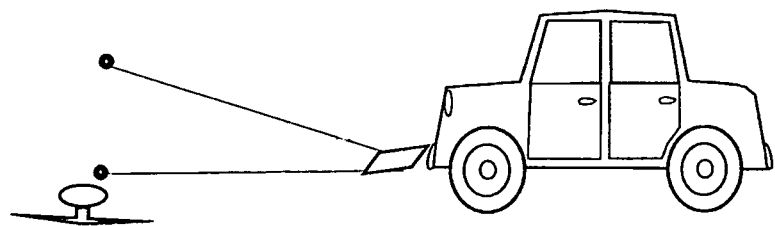
[[ Fig. 10 ]]    Fig. 1
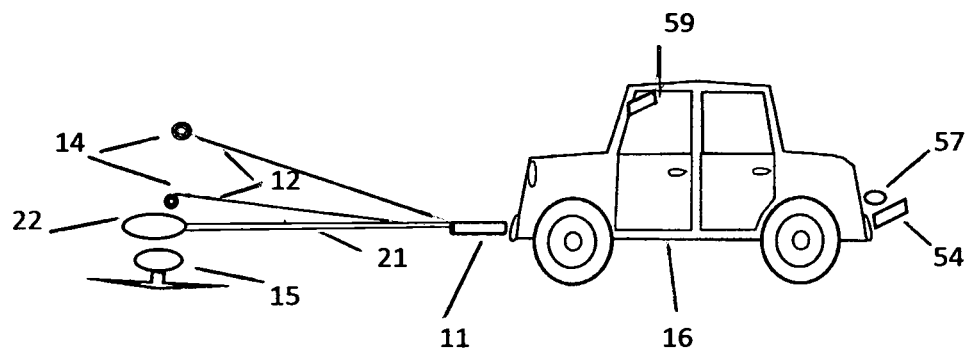

[[ Fig. 20 ]]  Fig. 2
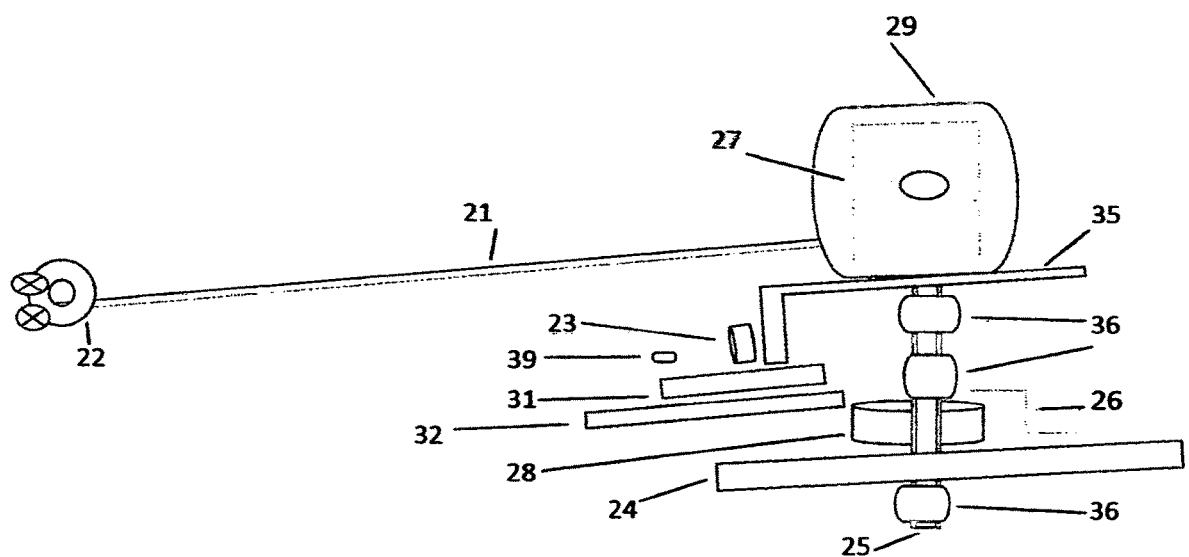
[[Fig. 20A]]  Fig. 2A
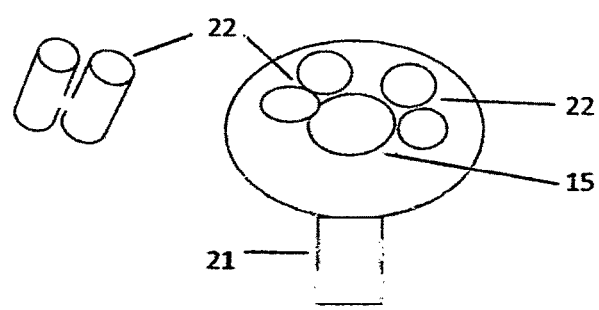

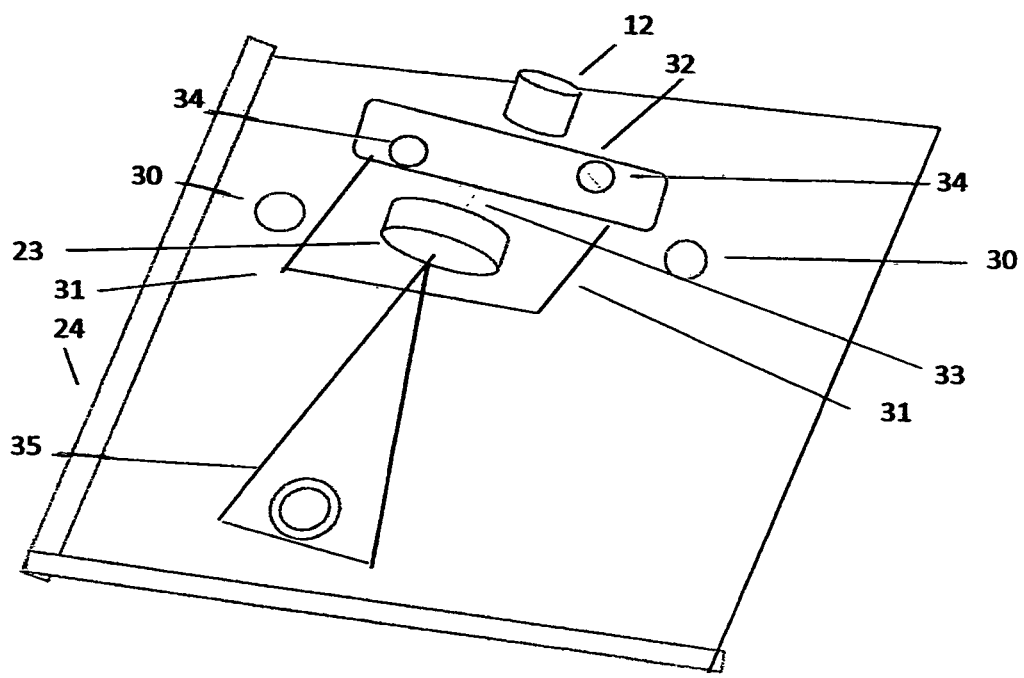
[[ Fig. 30 ]]  Fig. 3

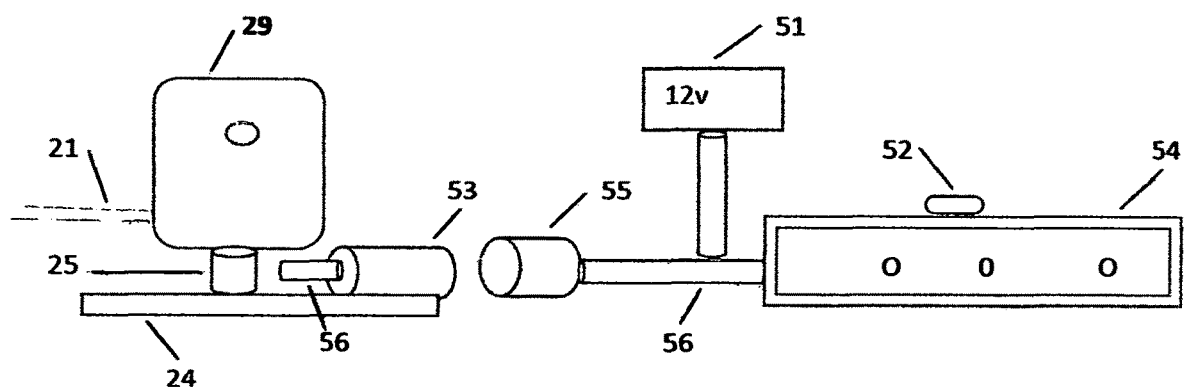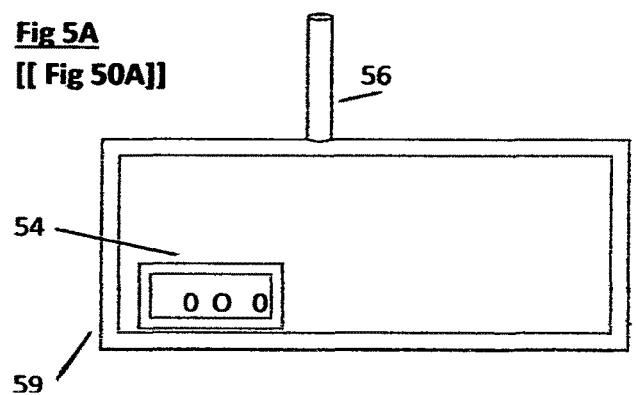

HITCHIN LASER GUIDE

CROSS-REFERENCE TO RELATED APPLICATION

This application claims the benefit of provisional patent application Ser. No. 62/595,057, filed 5 Dec. 2017 by the present inventor.

BACKGROUND

Hitching one vehicle to another presents a challenge for one individual attempting to accomplish the task alone. Prior art summarizes the inherent challenges facing a solo driver: No visual path, the inability to know the exact distance to the hitch, and the necessity to continually reposition a vehicle until contact is made.

Distance, however, is only one variable to consider. Dimension is critical.

Prior art (Martin) focuses on hardware and structure to solve the problem. The structure fails when the question of vehicle position is considered.

This structure presupposes the vehicle is always positioned in one direct path. Although the arm pivots, the user still has to make a physical determination as to where to initially place the vehicle in order to hit the touch point. If geography or angle varies, the structure would fail to account for the new dimension and new distance.

Prior art creates an unnecessary dependence on the visual alignment from the vehicle cab or inside the car, and quite possibly, the necessity to still physically get out of the vehicle to reposition the guide vehicle.

This embodiment, the Guide Hitch, addresses the prior art shortcomings by analyzing the critical component of position. The hitching point of the Guide isn't static but rather a two-dimensional point on a plane (x1, y1). Now the hitch point of a vehicle (x2, y2) becomes a pivot point(x2,y2) if x1=x2, y1=y2. No matter the vehicle's continuous backward path that involves continual directional correcting and over-correcting, the solo driver can be assured the guide vehicle will meet the hitch point, successfully hitching the two entities.

Second, the actual structure itself must possess components that exist physically rather than technically (Vause). Absent specific components, the invention relies only on the concepts or theories rather than structure itself.

Prior art (Vause) fails to explain the chosen hardware components that could achieve the level of technology outlined in the specifications. Vause's inference that the "graphical depiction of relative position of trailer" isn't hitch accurate and it appears the operator still needs visual action to hitch. The lack of a physical connection between the vehicles begs to question the alignment accuracy.

For Martin's design, the device is limited to in-line position only with no explanation as to varying angle approaches to the tow vehicle. The variable length pole requires manual height adjustment to fix the right position. The pressure switch, which retracts against pressure, doesn't allow for an exact point which may cause the ball to move beyond the hitch and a compressed spring.

In James Amerson's design, the alignment apparatus must be attached and aligned with each use. It's very difficult to visually align from the cab multiple times and the risk of misalignment or damage is great if the post hits the sensor. Mike Elkins' design is limited to only gooseneck or 5th wheel trailers. Goodwin's design is again only for gooseneck trailers and very limited with weight or uneven terrain. The laser also degrades in bright sunlight. Oscar Danielson's telescopic design is limited to one angle and difficult to align laterally with the hitch out of sight.

SPECIFICATIONS

The Hitchin Laser Guide consists of four separate parts: The Guide, the lasers and the laser guide. There are three modes of operation when hitching:
  Using lasers only
  Using the lasers with the Guide
  Or using the Guide

Overview

Hitchin Laser Guide (Guide) can be used as an independent application, operating as a standalone product to hitch vehicles. Dual lasers may be [FIG. 5, prior art] attached to the base of the Laser Guide when beams degrade due to visual uncertainty, such as bright sunlight. The operator has an option to use the dual lasers with the Guide to better track the beams. The other option is simply to use the Laser Guide without the lasers since the design offers almost equal accuracy to hitch point.

FIG. 1 Overview: Laser Guide
View: The Laser Guide [11] attached to the front of the vehicle [16] shows the tape [21] extended with roller loop [22] over hitch ball [15]. Laser beams [12] on targets [14] means the vehicle is at hitch point with both systems operating. The operator has an option to use either the lasers, the Laser Guide or both to position vehicle.

The operator display [59] inside the car is activated by the backup camera image of the panel lights. The already installed tow wiring harness and socket is used to communicate the tape movements to the panel.

The Guide operating procedure for hitching is simple and easy to use but the structure to support that procedure requires a retractable tape and two other devices. A measuring tape is used as a Retractable Tape Connector FIG. 2 between the Guide and a vehicle. This represents a new use of a measuring tape since it does not measure anything. The two other devices are Dual Light Signaling FIG. 3 and a Rolling Stop Switch FIG. 4. The interaction of these devices with the retractable tape is the essence of the embodiment. The guide interacts in two dimensions {x,y}, where x is the lateral distance from the tape centerline and is controlled by the Dual Light Signaling device. Y is the distance from hitch point and at hitch point both are zero (0,0) as x was aligned with the tape center with two lights on in the initial setup. Likewise Y is at that point on the tape where the conductive strip contacts rollers in the Rollng Stop Switch.

The modular design of the Guide provides flexibility to reconfigure various parts to meet hitch requirements of any vehicle. For example, if the Guide can be permanently attached, the plug[53] and socket [55] can be eliminated. Vehicles with a backup camera [57] can display an image [59] of the panel [54]. Guide attached to rear of a trailer would give operator back up guide lights. Trailers and fifth wheels may use different attachments and placements. Operating procedure and one time initial setup remain the same.

Retractable Tape Connector (RTC) FIG. 2
View of tape case (29) secured by a u-shaped fixture attached to a bolt on top of a large ball bearing secured to the base. A nut on the bolt holds the RTC small roller support against the bottom of the fixture. Both tape and roller are aligned and swivel together.

The Guide is designed as a one person hitching operation, specifically engineered with rollers and ball bearings to reduce friction allowing the RTC to accurately track vehicle movements. Several off the shelf measuring tapes were selected for testing during the prototype build. Early tests required a tape [21] that resisted twisting, had non conductive coating and minimal side to side clearance in the case 29. Also needed a strong spring to retract tape with roller loop [22].

Result is a heavy duty tape [21] mounted on a ball bearing 28 attached to a base [24] with 3 brackets 26. A bolt [25] through the ball bearing is secured by nuts 36 on each side of inner raised collar and passes through a large hole in the base. The upper part of the bolt secures the tape holder 27 and the RTC rollel support 35 with a nut. A screw 39 secures the roller to the support.

Since the bolt hole in the base is larger than the nut, the bolt assembly swivels to signal lateral tape movement. The lasers [12] follow the Laser Guide since both share the same base which moves with the vehicle.

FIG. 2A

View of the tape attached to a circular ring with two sets of two rollers contacting the ball stem. The rotation of the ring on the stem is maintained by the pull from the tape retractable spring.

Dual Light Signaling (DLS) FIG. 3

View from the driver position and below the extended tape. The small roller is on the dual metallic plate gap. Both guide lights will now be on and the car will be at hitch point when RSS is on. The two screws (34) secure the plastic below the plates after aligning the gap with center of tape during the one time setup.

Dual Light Signaling operationally keeps the vehicle on a guide path. The tape is considered a physical path when connected to the hitch ball. When the tape movement activates DLS, a virtual guide path is created using two lights that the operator views on a panel. These two lights turn on when a roller [23] is on the gap 33 separating two plates [31]. The centerline gap can be adjusted side to side with two screws. 34 The plates are secured on a thick plastic base [32] on top of the aluminum base [24]. This alignment is done during the initial one time setup when the vehicles are hitched.

The size of the roller and the width of the gap directly relate to the variance at the hitch ball. If left right signaling were used, variance increases due to a wider gap, hence less accuracy. Initial tests using 1/4 inch roller and a paper thin gap offered sufficient accuracy for alignment of vehicles when operator maintains vehicle on guide path.

Rolling Stop Switch (RSS) FIG. 4

Side view of RSS shows two rollers in contact with the metallic strip on the tape. Current flows from top roller to strip to bottom roller causing stop light on and driver to stop car at hitch point. A spring (47) keeps rollers pressed against tape in scissor fashion.

The guide uses a roller mechanism to activate a stop light. The light 46 alerts an operator to stop the vehicle [16] at hitch point. The rollers allow the tape and a metallic strip to move in and out of the tape case without binding as the vehicle starts and stops. The switch is activated when rollers come in contact with the metallic strip 41 on the non-conductive tape [21]. The strip was applied to the tape during the one time initial setup when the vehicles were hitched. The distance from the end of tape at hitch point to the metallic strip never changes since hitch hardware used during the one time initial setup is always the same for future operations.

Both upper and lower rollers are isolated from their support to allow current to flow to the upper roller 42 through the metallic strip to lower roller 44 completing the light circuit. The upper roller support is secured to the tape holder. The upper roller support 43 and the lower roller support 45 act like scissors with a spring 47 pulling the rollers together. This tension on the metallic strip helps to maintain roller contact to insure current flow.

Optional metallic strips can be applied to the tape. One applied prior to the rollers would serve as an alert to stop. One applied next to the end loop would activate the panel lights and vehicle run, turn and stop lights due to dual use of the car's tow harness. Checking brake lights requires two people, so this is a nice feature.

FIG. 4A

View of upper roller and insulated support.

FIG. 4B

View of lower roller and insulated support.

Operator Panel FIG. 5

View of the towed car electrical socket (55) used for 12 volt power from the car's battery and powers the Guide panel lights and car tow lights.

Vehicles that are towed are required by law to have lights the same as the tow vehicle. A plug [53] on the tow vehicle is inserted in a socket [55] on the towed vehicle to activate these lights. The guide takes advantage of this wiring and socket by installing a similar plug [53] on the guide which mimics the tow lights while activating the panel lights for turn and stop lights.

The panel with two guide lights, stop light and on-off switch [52] is located near the operator. Vehicle power[51] or internal power is supplied to the panel and to the socket [55]. When the plug is inserted, the panel lights [54] are energized along with the dual light signaling test lights 30 on the front of the guide. The test lights insure both panel lights are on when adjusting the gap alignment with center of tape, since the operator is outside with no panel view. The operator also checks that the test light in on when the dual light signaling roller is on the same plate during one time setup. The guide operating procedure requires the operator to turn the vehicle toward the panel light that is off to keep vehicle on path. However if the same test light is on, the wires in the panel have to be crisscrossed so that panel light is now off. Test lights are viewed from front of socket, panel lights are viewed from rear of socket. The crisscross of panel wires above was done so the operator viewing the panel would see light off even though it remained on as a test light. The wiring was done during the build, not the setup, and discussed here to insure the operating procedure will work as stated: All three lights will be on at hitch point: both dual signaling lights and stop light.

FIG. 5A

View: The image of the panel is viewed by the driver on the display (59) inside the car (FIG. 10). The image of the panel is captured by the back up camera.

When a vehicle has a backup camera, attaching remote panel within camera range allows the operator to see a remote panel image [54] on the inside camera screen [59]. The image offers added accuracy at hitch point because the guide lights solve the skewed view of the hitch point due to the offset camera.

Eliminating the inside remote panel and wiring is also a benefit.

For those cameras that activate only with transmission in reverse, will need an override switch to view panel image with vehicle moving forward.

FIG. 5B
FIG. 50B is a view of the Guide with the plug[53] used to communicate with the car's tow socket and wiring harness that was previouly installed for towing.
The guide plug [53] uses five of the six wire pins for positive, ground, left turn, right turn and brake to interface with the vehicle socket [55] and the remote panel [54].
The battery power [51] goes into the on off switch [52].
wiring:
Test and panel lights to positive battery terminal
Guide base to negative battery terminal
RSS base wire of isolated roller to stop light on panel
DLS base roller [23] to isolated plates [31], to test guide lights 30, to crisscross panel guide lights.
The wiring for trailers usually involves 4 wire flat plugs that may require an adapter.
Also, the retractable tape must be attached to a pivot point for accurate hitch point.

DETAILED SPECIFICATION

Figure 4A:
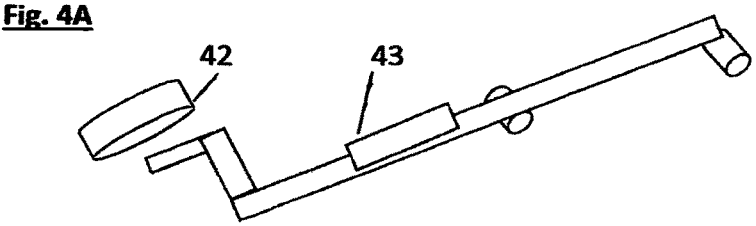
Figure 4B:
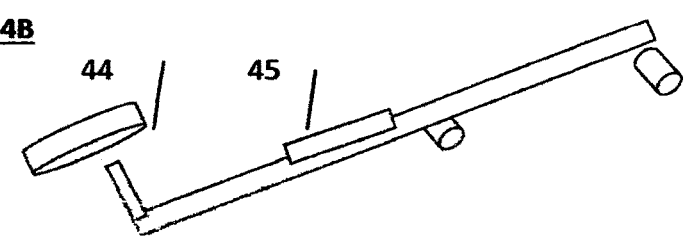

Ref. No. Hitchin Laser Guide FIG. 1
11 Laser Guide
12 Laser
14 Laser target
15 Hitch ball on top of stem
16 Tow vehicle
21 Retractable tape with non conductive coating
22 Roller loop, 2 sets of 2 rollers pulled against ball stem
54 Remote panel with three lights.
57 Backup camera on back of car
59 Camera display inside towed car
   Retractable Tape Connector FIG. 2
21 Retractable tape with non conductive coating
22 Roller loop, 2 sets of 2 rollers pulled against ball stem
23 RTC small roller 1/4 inch diameter
24 Guide aluminum base
25 Flat head bolt 3/8×3 inch
26 Ball bearing base brackets (3)
27 Tape holder, U shape with screw hole
28 Guide base ball bearing
29 Tape case, Stanley 16'range
31 Dual metallic plates
32 Plastic layer isolates dual metallic plates
35 RTC roller support with hole for bolt
36 Nut 3/8
39 Screw to attach RTC roller to support
   FIG. 2A
15 Hitch ball on top of stem
21 Retractable tape with non conductive coating
22 Roller loop, 2 sets of 2 rollers pulled against ball stem
   Dual Light Signaling (DLS) FIG. 3
12 Lasers
23 RTC small roller 1/4 inch diameter
24 Guide aluminum base
30 Guide lights, small LEDs
31 Dual metallic plates
32 Plastic layer, isolates Dual metallic plates from base
33 Paper thin gap
34 Adjusting screws to align gap to tape center
35 RTC roller support with hole for bolt
   Rolling Stop Switch (RSS) FIG. 4
21 Retractable tape with non conductive coating
22 Roller loop, 2 sets of 2 rollers pulled against ball stem
25 Flat head bolt 3/8 ×3 inch
27 Tape holder, U shape with screw hole
29 Tape case, Stanley 16'range 36 Nut 3/8
41 Conductive strip
42 RSS Upper roller
43 RSS Upper roller insulated support
44 RSS Lower roller
45 RSS Lower roller insulated support
46 RSS LED
47 Compression spring
   FIG. 4A
42 RSS Upper roller
43 RSS Upper roller insulated support
   FIG. 4B
RSS Lower roller
RSS Lower roller insulated support
   Panel FIG. 5
51 Battery 12v or small 9 v for LEDs
52 on off switch
54 Panel, (Guide LED, Stop LED, Guide LED)
55 RV Socket on car, 6 wire Industry standard layout
56 Wiring harness, industry standard
   Camera Display FIG. 5A
54 Panel, (Guide LED, Stop LED, Guide LED)
56 Wiring harness
59 Backup camera display with image of panel
   Guide connection to panel FIG. 5B
21 Retractable tape with non conductive coating
24 Guide aluminum base
25 Flat head bolt 3/8 ×3 inch
29 Tape case, Stanley 16'range
53 RV plug on Guide, round 6 wire
   FIG. 6 Overview: Dual Laser Beams
Hitchin Laser Guide (Laser Guide) is being submitted as an independent application operating as a standalone product to hitch vehicles. Dual lasers FIG. 6, prior art are attached to the base of the Laser Guide whose beams degrade due to visual uncertainty, such as bright sunlight. The operator has an option to use the dual lasers with the Laser Guide to better track the beams. The other option for the operator is simply use the Guide without the lasers since the design offers almost equal accuracy to hitch point.

OPERATION

The lasers and laser guide are available to the operator as a unit but operate independently with their own on-off switch. Positioning the vehicle can be done by the driver viewing laser beams, the panel lights, or both. The hitch point for the laser beams is their respective targets. The hitch point for the laser guide is having both dual signaling lights and rolling stop light on.
HITCH OPERATING PROCEDURE: Position vehicle within range of tape [21], insert Laser Guide plug [53] in vehicle socket [55], extend tape to tow vehicle ball [15], move vehicle forward on guide path [31A] until stop light [40D] is on at hitch point.

| Operating Procedure | DLS | RSS | DLS |
| --- | --- | --- | --- |
| Turn steering wheel left until DLS is ON | OFF | OFF | ON |
| Turn steering wheel right until DLS is ON | ON | OFF | OFF |
| STOP vehicle at hitch point | ON | ON | ON |

One time initial set up* with vehicles hitched
*Align center of tape with two guide lights on in Dual Light Signaling
*Affix conductive strip next to rollers on tape in Rolling Stop Switch

I claim:

1. A laser guide for hitching two vehicles, comprising dual lasers with their respective targets, a pivotally retractable tape with a roller loop, a dual light signaling device, a rolling stop switch, and a one-time initial setup, said laser guide further comprising:
   (a) said dual lasers mounted on the base of a laser guide vehicle, said roller loop on the end of said pivotally retractable tape is affixed to a hitch point on a vehicle having laser targets, an operator has an option to use the dual lasers with the laser guide to track weak laser beams in search of their respective targets;
   (b) wherein said tape physically connects said hitch point of said vehicle to the laser guide vehicle;
   (c) wherein said dual light signaling provides means for directing laser guide vehicle toward said tape hitch point; wherein said means for directing is initialized by said one time setup aligning said tape with two guide lights on, and having both vehicles hitched;
   (d) wherein said rolling stop switch provides means for stopping said laser guide vehicle at said tape hitch point, wherein said means for stopping is initialized by said one time initial setup applying a conductive strip to said tape flitch point, and having both vehicles hitched; and
   (e) wherein said tape provides means for communicating vehicle position comprising, dual light signaling status of two guide lights relative to said tape, said status transmitted to a display; said rolling stop switch status of stop light relative to said tape hitch point is transmitted to display.

2. A method of hitching with a laser guide, comprising the steps of:
   (a) providing dual lasers mounted on the base of a laser guide vehicle;
   (b) providing a roller loop on the end of a pivotally retractable tape affixed to a bitch point on a vehicle having laser targets;
   (c) providing an option to an operator to use the dual lasers with the laser guide to track weak laser beams in search of their respective targets;
   (d) providing dual light signaling means for controlling said laser guide vehicle moving toward said hitch point;
   (e) providing said laser guide having rolling stop switch means for stopping said guide vehicle at said hitch point; and
   (f) providing said laser guide with a one-time initial setup means to align said tape with said dual light signaling means, and one time initial setup means to install said tape hitch point for rolling stop switch means.

3. A laser guide for hitching two vehicles, comprising dual lasers with their respective targets, a pivotally retractable tape with a roller loop, a dual light signaling device, a rolling stop switch, and a one-time initial setup, whereby said vehicles are hitched; said laser guide further comprising,
   (a) wherein said dual lasers are mounted on the base of a laser guide vehicle, said pivotally retractable tape is affixed to a hitch point on a vehicle having laser targets, said laser guide vehicle moving toward hitch point provides optional guidance of weak laser beams searching for their respective targets;
   (b) wherein said dual light signaling device comprises a display of two guide lights viewed by an operator, two conductive plates separated by a hairline gap, a roller moving laterally across said plates activates said guide lights, said roller on gap activates both said guide lights, an operator keeping said two lights on controls vehicle toward hitch point, and wherein said two lights are aligned with said tape during said one time initial setup with vehicles hitched;
   (c) wherein said rolling stop switch comprises said retractable tape with non-conductive coating sandwiched between upper roller and lower roller, a conductive strip of adhesive wrapped around said retractable tape next to rollers, wherein said strip applied to the tape during one-time initial setup when vehicles were previously hitched; current flows from upper roller through the conductive strip to lower roller, said current turns light on alerting operator to stop vehicle at hitch point, whereby vehicles are hitched; and
   (d) wherein a backup camera displays dual light signaling guide lights and rolling stop switch light.

* * * * *